Nov. 4, 1952 J. G. AMMON 2,616,206
FISHING PLUG
Filed July 17, 1950
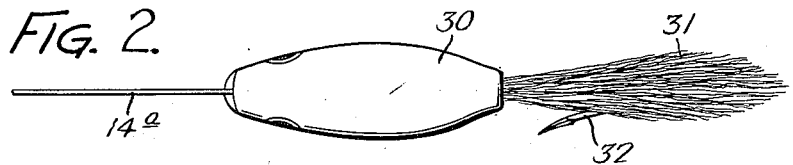
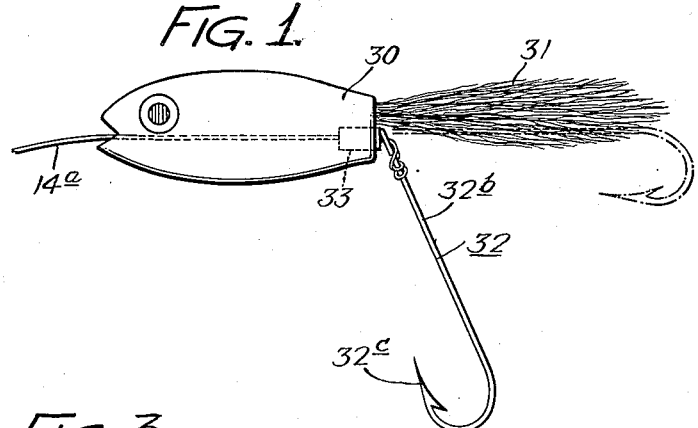
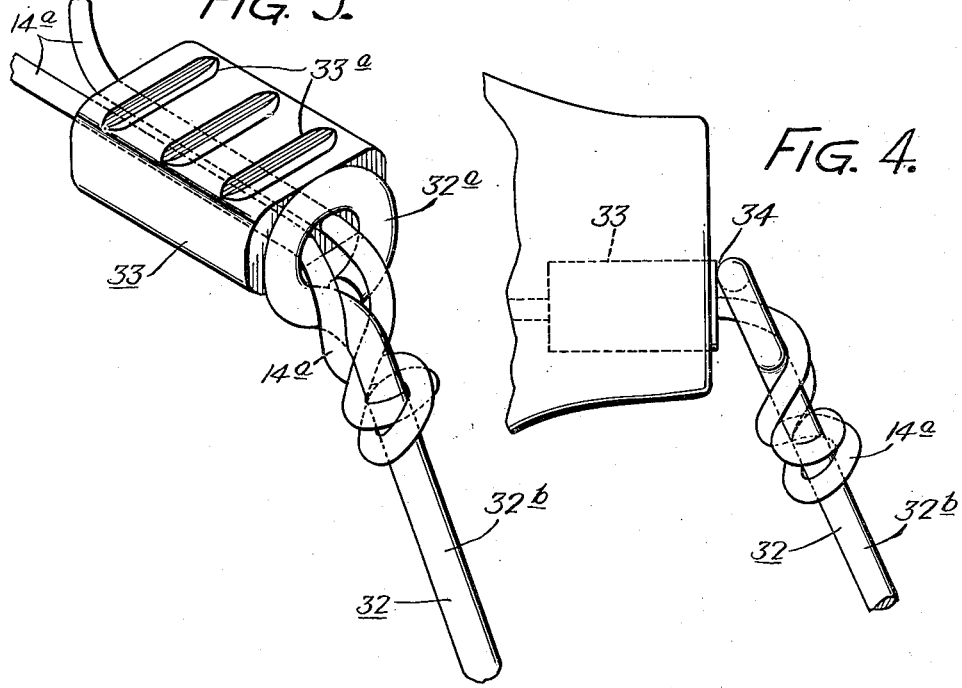
Inventor:-
Justin Guy Ammon
by his Attorneys
Howson & Howson Patented Nov. 4, 1952

2,616,206

UNITED STATES PATENT OFFICE 2,616,206

FISHING PLUG

Justin Guy Ammon, Rehoboth Beach, Del.

Application July 17, 1950, Serial No. 174,173

5 Claims. (Cl. 43—42.36)

This invention relates to fishing plugs and is directed more particularly to what may be described as a baited bobber lure.

In certain types of fishing, I have found that it is highly desirable to insure that the bait on the lure is at all times removed from the bottom where it may be reached by crabs. Ordinarily, baited hooks are attached at spaced intervals along the line at different points above the dipsey to accomplish this purpose. Frequently however, these hooks do not remain clear of the fishing line and they are not sufficiently animated to attract the fish. The present invention has as its object the provisions of an improved lure which incorporates a light body which causes the lure to float upwardly and away from the line, together with a hook connection that is especially designed to retain the bait in an offset position with respect to the centerline of the body of the lure. In one form of the invention, I employ a resilient connection for the hook which always tends to spring back to a predetermined angle with the body.

A further object of the invention is to provide a fishing lure having a buoyant body and a hook resiliently attached at an angle to the body.

A further object of the invention is to provide an improved connection between a buoyant fish lure body, leader and hook.

A further object of the invention is to provide a fishing lure with a hook that is substantially offset with respect to the body of the lure.

Further objects will be apparent from the specification and drawings, in which:

Fig. 1 is a side view of a preferred form of lure;

Fig. 2 is a top view of the structure of Fig. 1;

Fig. 3 is an enlarged perspective showing the connection between the leader and the hook, as used in Figs. 1 and 2; and Fig. 4 is an enlarged fragmentary detail of the line of Figs. 1 and 2 showing the body of the lure with the connection applied thereto.

The present invention is characterized by a lure having a buoyant body and a hook resiliently connected to a resilient member secured to the body or a synthetic leader extending longitudinally through the lure body. The particular connection employed between the hook and the resilient member or nylon leader resiliently positions the hook at an angle to the axis of the lure body.

I have found that when the bait is secured to the conventional lure, in which the shank is rigidly secured in the body of the lure coaxially with the leader, the fish frequently knock the hook and bait aside and avoid being caught. This may be explained by the fact that fish usually swim in a horizontal plane. When the bait is held in nearly the same plane or level as is the body of the lure, definitely better results are obtained because the fish cannot conveniently strike at the lure itself without taking the bait and the hook.

Referring now particularly to the accompanying drawing in which a preferred form of my present invention is illustrated, the lure shown therein comprises a buoyant body 30 preferably made of balsa wood, that is shaped and painted to resemble a small fish. If desired, the body 30 may be provided with a tail 31 made of hair or similar material. The monofilament nylon leader 14a passes through the mouth of the fish body and is secured at the tail of the body to a hook 32, as shown clearly in Fig. 1.

Attention is especially directed to the manner in which the hook 32 and leader 14a are secured to each other and mounted in the body 30 of the lure. The leader 14a is threaded through the eye 32a of the hook (Fig. 3), thence it is wrapped two or three times around the shank 32b of the hook, and the free end re-inserted through the eye from the same side that the leader was previously threaded so that both plies of the leader are parallel and lie adjacent one another in the eye 32a. A metallic fitting 33 of lead or brass is then swaged or crimped as at 33a, 33a over both plies of the leaders and sufficiently close to the eye 32a that the shank 32b of the hook is displaced sideways with respect to the axis of the fitting 33. In effect, the eye 32a is fulcrumed against the fitting 33 at 34 (Fig. 4). Since the leader has inherent resiliency, any longitudinal tension on the hook is ample to straighten the shank of the hook so that it is in alignment with the leader as shown in broken lines in Fig. 1. This occurs when a fish is caught. However, when tension on the hook 32 is released, it immediately springs back to substantially the 45° position shown in full lines in Fig. 1. I find it desirable to recess the body 30 sufficiently to receive the fitting 33 and the fitting may, if desired, be glued in the recess to prevent its accidental removal therefrom. Also, it is desirable to thread the eye 32a of the hook in such a way that the point or barb 32c of the hook is on the bottom (as shown in Fig. 1) rather than on the top.

It will thus be understood that I have provided a highly efficient, inexpensive fishing lure which permits the bait to be positioned in the water at a predetermined angle to the axis of the leader. The hook on the lure is readily movable with respect to the leader so that when the fish takes the bait, the shank of the hook assumes a straight-line position under tension. After the fish is removed from the hook and it is rebaited, the original predetermined angle is either automatically taken by the hook, or it may be readily reset by the fisherman.

Having thus described my invention, I claim:

1. A bobber fish lure comprising a buoyant body, a resilient member of elastic material attached to said body, said member being threaded through the eye of a fish hook at one end of said body, wrapped around the shank of the fish hook and rethreaded in the same direction through the eye of the hook, and the member being secured to the body to provide limited tension at the base of the hook, whereby said shank of the hook is resiliently displaced from the centerline of the lure body.

2. A fish lure in accordance with claim 1, having a clamp closely spaced to the eye of the hook for retaining the member.

3. A bobber fish lure comprising a buoyant body shaped to resemble a fish, a resilient leader of elastic material extending longitudinally through said body, said leader being threaded through the eye of a fish hook at the tail of the body, wrapped around the shank of the fish hook and rethreaded in the same direction through the eye of the hook, and the leader being secured to the body to provide limited tension at the base of the hook, whereby the shank of the hook is resiliently displaced from the centerline of the lure body.

4. A fish lure in accordance with claim 3, having a metallic fitting clamped to both plies of the leader adjacent the eye of the hook.

5. A fish lure in accordance with claim 3, having a metallic fitting glued in the body of the lure and clamped to both plies of the leader sufficiently close to the eye of the hook to bias the hook with respect to the centerline of the fitting and to provide a fixed fulcrum for pivotal movement of the hook with respect to the fitting and the lure body.

JUSTIN GUY AMMON.

REFERENCES CITED

The following references are of record in the file of this patent:

UNITED STATES PATENTS

| Number | Name | Date |
|---|---|---|
| 790,336 | Yoerger | May 23, 1905 |
| 1,589,522 | Felix | June 22, 1926 |
| 1,996,776 | Strausborger | Apr. 9, 1935 |
| 2,456,254 | Caruso | Dec. 14, 1948 |
| 2,527,468 | Turner | Oct. 24, 1950 |

FOREIGN PATENTS

| Number | Country | Date |
|---|---|---|
| 622,242 | Germany | Nov. 23, 1935 |